Patented Mar. 3, 1925.

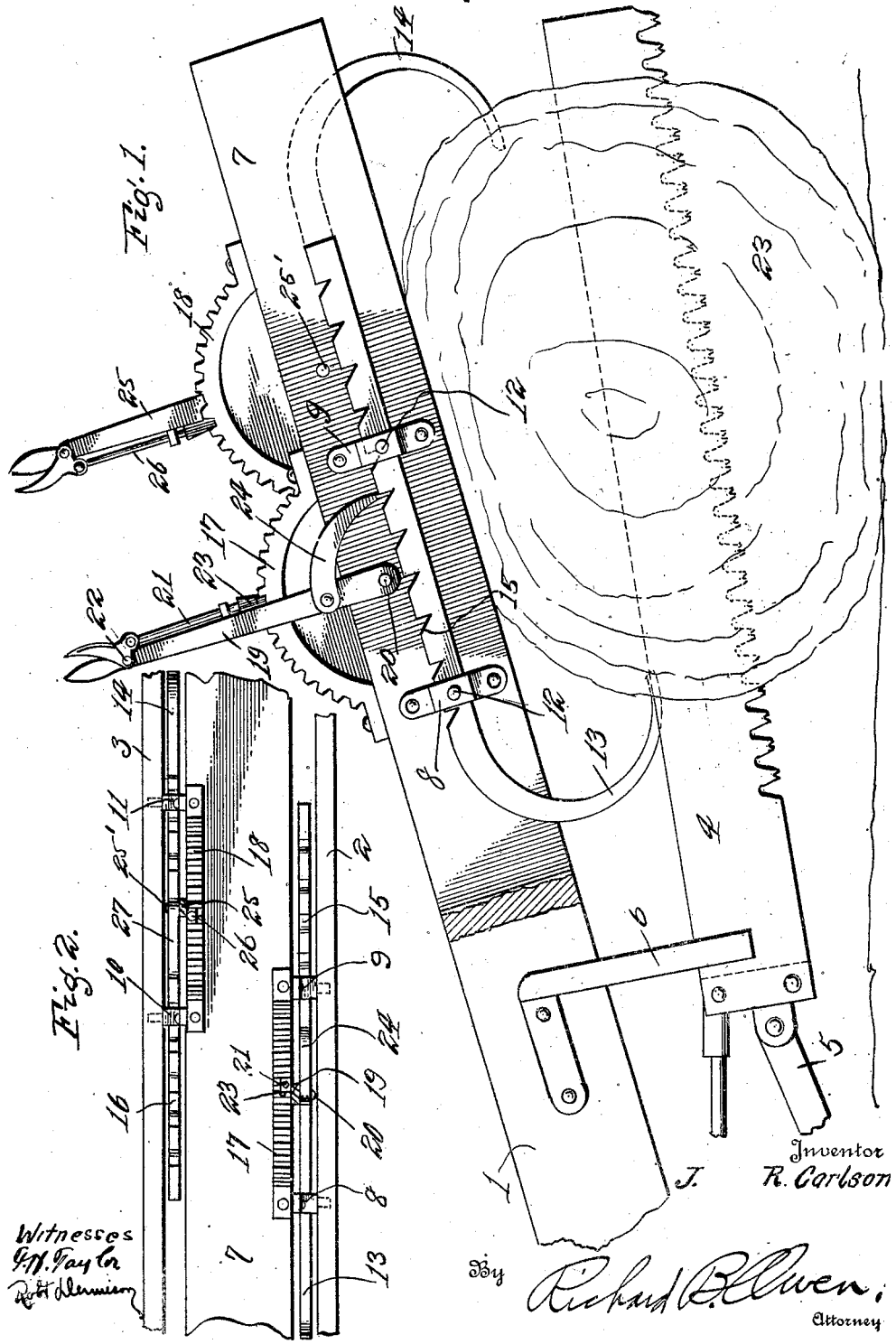

1,528,467

UNITED STATES PATENT OFFICE.

JEWETT R. CARLSON, OF WEST SALEM, WISCONSIN.

DOGGING EQUIPMENT.

Application filed September 7, 1922. Serial No. 586,706.

*To all whom it may concern:*

Be it known that I, JEWETT R. CARLSON, a citizen of the United States, residing at West Salem, in the county of La Crosse and State of Wisconsin, have invented certain new and useful Improvements in Dogging Equipments, of which the following is a specification.

This invention relates to a dogging equipment and is more preferably used in connection with portable power driven log saws.

A still further object of the invention is to provide a clamping mechanism which is adapted to secure a log on the frame of a portable sawing machine for the purpose of preventing the log from rocking while the same is in the process of being sawed.

A still further object of the invention is to provide a dogging equipment of the above mentioned character, which can be easily applied to a portable motor driven logging saw, and does not require any alteration of the logging saw carriage to attach the same thereto.

Other objects and advantages of this invention will become apparent during the course of the following description.

In the accompanying drawings forming a part of this specification and wherein like numerals designate like parts throughout the same—

Figure 1 is an enlarged side elevation showing the logging hook in engagement with a log and secured to a saw carriage, and Figure 2 is a top plan view of the dogging equipment showing the arrangement of the hooks.

In the drawings wherein for the purpose of illustration is shown the preferred embodiment of my invention, the numeral 1 designates a suitable saw carriage, preferably made up of two elongated sections 2 and 3. This saw carriage is adapted to support the saw 4 as connected thereto by any suitable securing means 5, however, it is not thought necessary to show the securing means as this does not add to the function of the invention. The saw is adapted to be reciprocated in relation to the saw carriage and is also adapted to be guided in its reciprocatory movement through a guide element 6, this guide element 6 being connected to one of the sections 2 of the saw carriage 1.

The dogging equipment is adapted to be associated between the two sections 2 and 3 of the saw carriage 1 and the dogging equipment consists of a suitable support 7. Mounted on one of the side faces of the support 7 are the guide elements 8 and 9. A similar pair of guide elements are adapted to be secured to the opposite side of the support 7 and are more clearly shown at 10 and 11 in Fig. 2 of the drawing. These guide members are provided with laterally extending pins 12 for the purpose of supporting the support 7 between the two sections 2 and 3 of the saw carriage 1.

Slidably mounted in each pair of the guide members 8 and 9 and 10 and 11 respectively, are the hooks 13 and 14 respectively. These hooks 13 and 14 are arranged in the guide members 8 and 9 and 10 and 11 respectively in such a manner that they are oppositely disposed so that the hook portions thereof face each other. The shank of these hooks members 13 and 14 are provided with ratchet teeth 15 and 16 respectively for a purpose to be hereinafter fully described.

Mounted on the top face of the support 7 and between the guide members 8 and 9 and 10 and 11, and adjacent the hooks 13 and 14 respectively, are the rack segments 17 and 18. A suitable lever 19 is pivotally connected on one side of the support 7 adjacent the hook 13 and above the ratchet shank 15 of the hook portion 13 as shown in Fig. 1 of the drawings. This lever is pivoted at 20 to the support 7 and has an auxiliary lever 21 which is connected at the handle portion 22 thereof for the purpose of allowing the headed end 23 of the auxiliary lever 21 to engage the rack segment 17 which is mounted on the top face of the support 7 for holding the lever in an adjusted position. The lever 19 has a pawl 24 pivotally mounted thereon adjacent the pivotal end 20 thereof for engagement with the ratchet teeth 15 formed in the shank of the hook member 14. The rack segments 17 and 18 are secured on the top face of the support 7 in any suitable manner and it is not thought necessary to limit myself to the manner in which they are mounted thereon.

A similar lever 25 is pivoted at 25' on the opposite side face of the support 7 and in the same manner as the lever 19 heretofore fully described. This lever 25 carries the auxiliary lever 26, and this auxiliary lever 26 is fastened to the lever 25 in a similar manner as the auxiliary lever 21 is fastened on the lever 19 and is used for the same purpose. The pawl 27 carried by the lever 25 is adapted to engage the ratchet teeth 15 formed on the oppositely disposed hook 14. By the arrangement of the rack segment and levers on the support 7 as shown in the drawings, the hooks may be operated simultaneously, easily and efficiently.

When it is desired to saw logs, the saw carriage 1 is so placed upon the log to be sawed, that the sections 2 and 3 of the saw carriage 1 will rest at an angle on the top of the log 23 as shown in Fig. 1 of the drawings. By operating the levers 19 and 25 together with the auxiliary levers 21 and 26 respectively wherein the auxiliary levers are released from the rack segments 17 and 18 the pawls 24 and 27 pivotally carried by the levers 19 and 25 respectively will be caused to engage the ratchet teeth 15 and 16 of the hooks 13 and 14 respectively in such a manner that the hooks will be caused to separate and after the saw carriage has been placed on a log, the levers are then reciprocated so as to cause the pawls 24 and 27 to engage the ratchet teeth 15 and 16 above mentioned, in such a manner as to cause the hooks 13 and 14 to simultaneously come together until the points thereof engage the sides of the log to be sawed.

After the points of the hooks 13 and 14 have engaged the sides of the log, the auxiliary levers 21 and 26 are then released to cause the same to engage the rack segments 17 and 18 respectively in order that the hooks may be held in their adjusted position upon the log. After the hooks 13 and 14 are engaged with the log, the saw is then reciprocated in such a manner as to operate through the log and thereby cut the same, and it will be thus seen that the saw during its reciprocatory movement will be able to saw through the log without the log having a tendency to rock and thereby prevent the saw from operating to its best advantage. After the log has been sawed entirely through, the levers 19 and 25 are again operated so as to cause the hooks 13 and 14 to be released from the log, and the operation for again supporting the log in position upon the saw carriage is repeated in the manner above described.

It will thus be seen from the foregoing description that an easy and simple device is provided for the purpose of facilitating the rapid cutting or sawing of a log and further—being adapted to be easily attached and disconnected to the saw carriage.

It is to be understood that the form of my invention herewith shown and described is to be taken as the preferred embodiment of the same, and that various changes in the shape, size and arrangement of parts may be resorted to without departing from the spirit of the invention or the scope of the subjoined claims.

Having thus described my invention, what I claim is:—

1. The combination with a portable sawing machine including a rectangular frame having a pair of forwardly extending spaced beams arranged to rest upon the work to be sawed, and means associated with the frame for receiving a reciprocatory saw, of a clamping means associated with the frame for engaging the work including spaced longitudinally aligned guides, rack bars slidably mounted in the guides, oppositely disposed hooks formed on the opposite ends of the rack bars and independent operating levers for moving the hooks relative to each other and for holding the rack bars and hooks in their adjusted position.

2. The combination with a portable sawing machine including a frame having a pair of spaced parallel beams arranged to rest upon the work to be sawed, of a clamping means carried by the frame for engaging the work including a support connected with the frame and disposed between the beams, pairs of guides carried by the opposite faces of the support, oppositely disposed hooks each including a shank slidably mounted in the guides and a depending bill the upper faces of the shanks being provided with ratchet teeth, a pivoted lever secured to each face of the support, means for locking the levers in adjusted positions and means carried by the lever for engaging said ratchet teeth to move the hooks relative to one another.

3. As a new article of manufacture, a clamping device for a portable sawing machine comprising a support, spaced longitudinally aligned guides carried by the opposite faces of the support, rack bars slidably mounted in the guides, oppositely disposed hooks formed on the opposite ends of the rack bars, independent operating levers carried by the support for moving the hooks relative to each other and for holding the rack bars and hooks in their adjusted positions, and laterally extending attaching pins carried by the support for connection with the sawing machine.

In testimony whereof I affix my signature in presence of two witnesses.

JEWETT R. CARLSON.

Witnesses:
FRANCIS MURRAY,
B. A. MAU.